May 15, 1928.

W. G. NORDLING ET AL 1,669,485

METAL RECLAIMING PROCESS

Filed March 17, 1926

INVENTORS
William G. Nordling and
Alexander Stewart Jr.
BY
ATTORNEY

May 15, 1928.  
W. G. NORDLING ET AL  
1,669,485  
METAL RECLAIMING PROCESS  
Filed March 17, 1926   2 Sheets-Sheet 2

INVENTORS  
William G. Nordling and  
Alexander Stewart, Jr.  
BY  
ATTORNEY

Patented May 15, 1928.

1,669,485

UNITED STATES PATENT OFFICE.

WILLIAM G. NORDLING, OF NEWARK, AND ALEXANDER STEWART, JR., OF ROSELLE, NEW JERSEY.

METAL-RECLAIMING PROCESS.

Application filed March 17, 1926. Serial No. 95,191.

The invention relates to the recovery or reclaiming of an alloy or of a metal from a mixture of metals, alloys or oxides of metals; the separation being effected under conditions which involve a molten state of but one of the constituents at a time, it being understood that the said constituents of a mixture have different melting points.

As a particular embodiment of the invention, the same is shown and described in connection with the separation of solder from discarded radiators of automobiles, although it is to be understood that the process is applicable to many other metal mixtures or metal or oxide mixtures such as electrotype material, lead sheath cable, a mixture of lead and lead oxide, etc. In the case of radiators, the shells of the same are generally composed of brass or copper and the various portions and members of the structure are soldered together with a solder containing usually tin and lead and generally present in about equal proportions. In accordance with the invention, this tin and lead alloy is to be separated as alloy and to as large a degree as possible from the brass or copper body portion of the structure without impairing the quality of the latter material which, as a matter of fact, is improved in appearance as a result of the treatment such that the same as well as the solder is in a marketable condition.

Heretofore, a separation of the solder has been attempted thru immersion in heated oil of the soldered structure; but due to the temperature involved in this procedure sulphur of the oil is freed and forms a surface film preventing a thorough removal of the solder and destroying the quality of the alloys.

The nature of the invention, however, will best be understood when described in connection with the accompanying drawings which illustrate more or less diagrammatically apparatus for carrying out the novel process, and in which—

Figure 1:
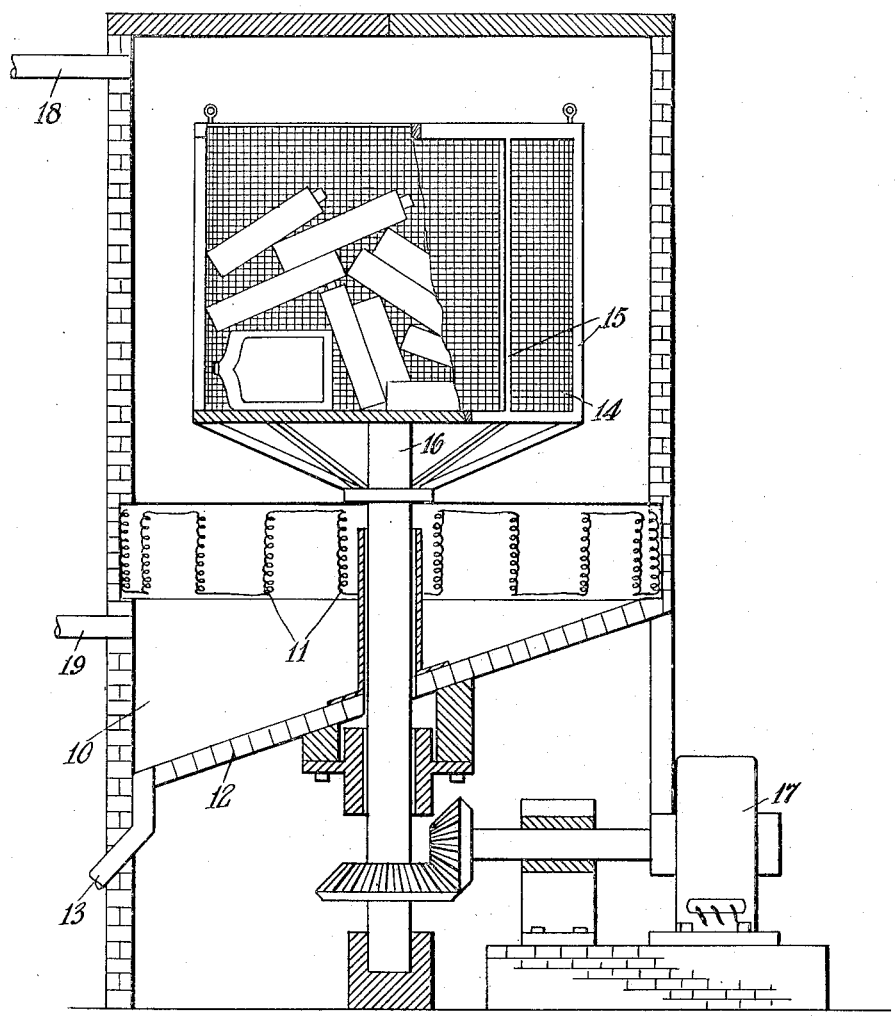
Fig. 1 is a vertical section thereof.
Figure 2:
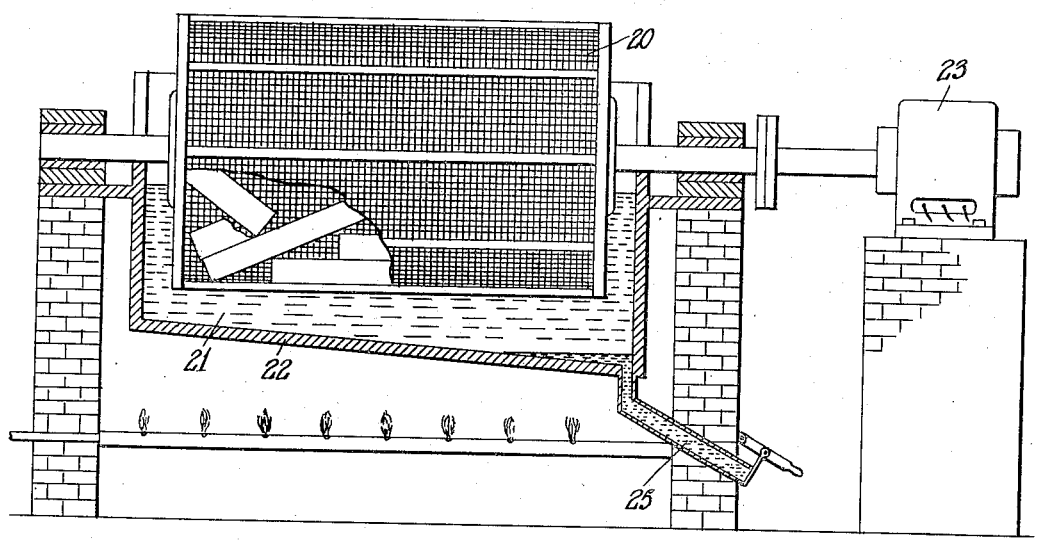
Fig. 2 is a similar section of a different form of apparatus.
Figure 3:
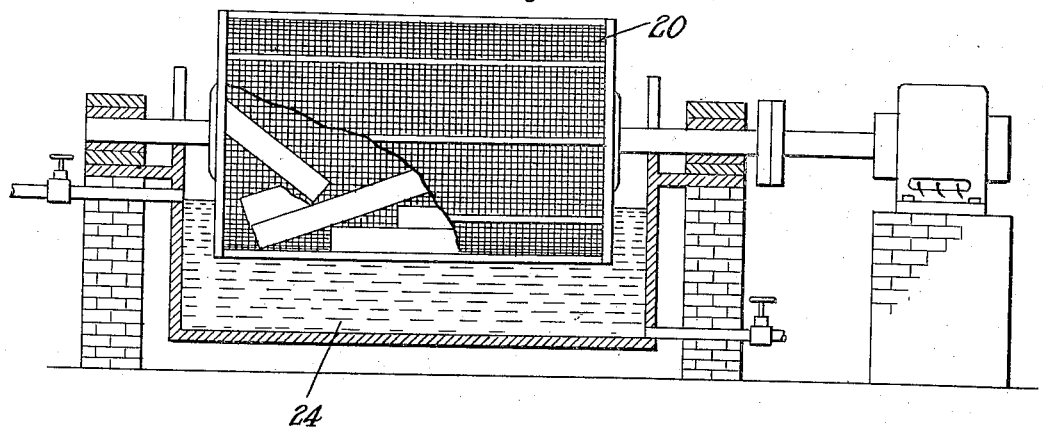
Fig. 3 is a section of a tank for washing metal treated in the apparatus shown in Fig. 2.

Referring to the drawing, 10 designates a container wherein there is charged the material of which the separation or reclamation of a constituent is to be effected; and 11 designates means for heating the same to the required temperature, for example the electric heater shown. It will be understood that in effecting a separation, the constituents must be such that the melting temperature of the particular metallic constituents or alloys separated is below that of a remaining constituent or constituents. Other metallic constituents may then be progressively or fractionally removed by correspondingly raising the temperature thru the heating means 11. The said heating chamber or container may be of any well-known type or construction so far as furnishing heat to the material is concerned, and is provided with some means of collection for molten metal or alloy, as by providing an inclined bottom 12 of suitable pitch to enable the metal to flow to the lower portion for collection and delivery therefrom as thru a suitable spout 13.

The material charged into the container 10 is initially received in an inner member or cage 14, surrounded by an open frame 15, wherein it is to be suitably agitated and which cage may be mounted separably from a shaft 16 adapted to rotate the same. Said cage is of foraminous or perforated material, the size of the openings being determined by the conditions and character of the material to be separated. Furthermore, the same is designed to be rotated at suitable velocity; and to this end, is mounted upon the said shaft 16 which may be vertical or inclined with respect to the axis of the container 10. Rotation at the required speed may be imparted thereto from an electric motor 17, the speed as well as the temperature to which the contained material is subjected being variable and depending upon the materials to be separated. Moreover, the separation may be made under conditions of vacuum, pressure, a reducing atmosphere, an oxidizing atmosphere or a neutral atmosphere in manner well understood, connections 18 and 19 being made to the container for this purpose.

By thus heating the mixture to an extent necessary merely to melt the alloy or metal of lowest melting point with suitable agitation, preferably by centrifuging the same at suitable velocity, a large proportion of the molten portion will be separated from the more or less rigid structure or body portion of the scrap radiator and the like.

To substantially complete the separation, the radiator or like member partly freed of its solder is charged, for example, into a perforated cylinder or cage 20 which is preliminarily rotated to sieve out loose particles as oxides and surface impurities and is then treated in a bath 21 of molten sodium or potassium cyanide, or a mixture thereof. This material may be heated in a tank 22 into which the cage 20 is immersed and rotated by a motor 23; or, the cage may be merely agitated within the molten sodium cyanide until substantially all of the solder has been removed therefrom, it being understood that the bath is to be maintained at a temperature slightly above the melting point of the cyanide. The cage 20 containing the radiator shells, now substantially free of solder, is dipped several times into a further tank 24 containing hot or cold water to remove any adherent cyanide, leaving the copper or brass radiator shell practically free from tin and lead of the solder, and also of surface impurities. The solder is removed from the molten cyanide by tapping off from the bottom at which it settles out, as thru a spout 25.

The use of molten cyanide in this respect is particularly advantageous in that it serves to reduce also any tin or lead oxide, which may form due to the heating, to metallic tin and lead which combine as alloy. It, furthermore, prevents the removal of the zinc constituent from brass. Of course, the discarded radiator or like material may be dipped directly into the molten cyanide; but we have found it advantageous to subject the mixture to a preliminary separation, as the thermal centrifugal separation set forth which removes some 80% to 85% of the solder, some 60% to 70% of the remainder being recovered by the subsequent cyanide treatment.

By the process hereinbefore described, it has been found possible to reclaim as much as 90% of the total solder and at the same time clean the brass or copper shell so that it is in first class condition for melting and reuse. It will be understood, of course, that the nature of the material composing the molten bath must be such as to be substantially inert, at the temperature employed, with respect to the material from which a separation, as of an alloy, is to be effected. In the particular embodiment of the invention set forth, sodium cyanide has been found most suitable; but it is to be understood that the invention broadly comprehends the separation in any molten bath, the material of which is substantially inert with respect to not only the unmelted constituent of the mixture but has no objectionable effect upon the material separated in molten condition at the temperature of said bath.

We claim:—

1. The metal reclaiming process, which comprises a preliminary separation thereof by subjecting a metallic mixture to a temperature sufficient to melt one of the constituents but not the residue, agitating the mixture to remove the molten constituent from the residue, withdrawing said molten portion, then immersing the residue in a bath of molten material to melt out further quantities of the constituent originally treated for removal, said bath being inert with respect to said residue and molten constituent and at a temperature below the melting point of the residue, and withdrawing the molten portion from the bath.

2. The metal reclaiming process, which comprises a preliminary separation thereof by subjecting a metallic mixture to a temperature sufficient to melt one of the constituents but not the residue, subjecting the mixture to centrifugal action by rotating the same, withdrawing said molten portion, then immersing the residue in a bath of molten sodium cyanide to melt out further quantities of the constituent originally treated for removal, said bath being at a temperature below the melting point of the residue, and withdrawing the molten metal.

3. The method of reclaiming solder from discarded automobile radiators, which comprises subjecting the same to a temperature sufficient to melt the solder but below the melting point of the metal of the body of the radiator, subjecting the same to centrifugal action by rotating it, withdrawing the molten solder, immersing the residue in a bath of molten sodium cyanide to melt out further quantities of the solder, said bath being at a temperature below the melting point of the said metal, agitating the radiator, and withdrawing the molten solder.

4. The metal reclaiming process, which comprises a preliminary separation thereof by subjecting a metallic mixture to a temperature sufficient to melt one of the constituents but not the residue, agitating the mixture to remove the molten constituent from the residue, withdrawing said molten portion, screening the residue, then immersing the residue in a bath of molten material to melt out further quantities of the constituent originally treated, said bath being inert with respect to said residue and molten portion and at a temperature below the melting point of said residue, and withdrawing the molten portion from the bath.

5. The metal reclaiming process which includes immersing the metallic mixture in a bath of a molten cyanide of an alkali metal to melt one of the constituents, said bath being inert with respect to the residue and the molten portion and at a temperature below the melting point of the residue, and withdrawing the molten portion.

6. The process of reclaiming solder from discarded automobile radiators, which comprises immersing the radiator bodies as a whole in a bath of molten sodium cyanide to melt out the solder, and withdrawing the molten solder from said bath.

In testimony whereof we affix our signatures.

WILLIAM G. NORDLING.
ALEXANDER STEWART, Jr.